United States Patent [19]

Scarlet et al.

[11] Patent Number: 4,492,963

[45] Date of Patent: Jan. 8, 1985

[54] METHOD AND APPARATUS FOR DETERMINING LANE COUNT ERROR IN A RADIO NAVIGATIONAL SYSTEM

[75] Inventors: Richard I. Scarlet, Boxborough, Mass.; James B. Andrews, Nashua, N.H.; William F. Henning, II, Annandale, Va.

[73] Assignee: EG&G, Inc., Wellesley, Mass.

[21] Appl. No.: 538,822

[22] Filed: Oct. 5, 1983

[51] Int. Cl.³ ............................................. G01S 3/02
[52] U.S. Cl. ................................. 343/464; 364/452
[58] Field of Search ............... 343/387, 389, 394, 396, 343/464, 6.8 R; 364/452

[56] References Cited

U.S. PATENT DOCUMENTS 3,103,579  9/1963  Green .
3,254,341  5/1966  Broussaud .
3,388,373  6/1968  Prebish .
3,689,926  9/1972  Honore et al. .
3,774,215  11/1927  Reed .
3,787,844  1/1929  Hastings et al. .

*Primary Examiner*—Theodore M. Blum
*Attorney, Agent, or Firm*—Finnegan, Henderson, Farabow, Garrett & Dunner

[57] ABSTRACT

A method and apparatus for determining lane count error in a conventional navigational system which gives the position of a vessel in an integer and fractional lane count format but has an inherent integer lane count ambiguity. A second navigational system capable of determining the distance between the vessel and a surveyed transponder or other fixed element is placed on board the vessel. Readings are taken from both the conventional and the second navigational system at at least two separate positions of the vessel. By combining and comparing the data obtained from both systems, an operator can determine the lane count error in the conventional system.

7 Claims, 7 Drawing Figures

METHOD AND APPARATUS FOR DETERMINING LANE COUNT ERROR IN A RADIO NAVIGATIONAL SYSTEM

BACKGROUND OF THE INVENTION

1. Field of the Invention

The present invention relates generally to a method and apparatus for determining lane count error, if any, in a navigational system such as a range-range or hyperbolic system. Through the described method and apparatus of the present invention, an operator can economically determine whether a radio navigational system is giving erroneous positional information because it has lost or gained an integer lane count or counts and can determine the correct lane count, if there is an error.

2. Description of the Prior Art

Many ships and vessels utilize a radio or acoustic navigational system to determine accurately their position. Two major types of navigational systems are now in use: range-range systems and hyperbolic systems. Both of these systems are well-known in the art, and each includes a plurality of shore-based stations placed at precisely known locations and a navigational instrument (often a receiver and calculator) on board the vessel. The shore-based stations and the vessel-based instrument transmit and/or receive signals. In some systems the shore-based stations and the vessel-based instrument both transmit and receive signals from each other. In other systems, only the shore-based stations transmit signals; the vessel-based instrument only receives the signals and performs calculations based upon the reception.

All of these systems ultimately give the position of the vessel in an integer and fractional lane count format. For example, the system might give a reading of 140.13 from station no. 1 and 167.25 from station no. 2. Each lane count represents a known distance defined by the repetition rate of the signal and the speed of the signals. Only the fractional lane count can be directly determined by the shipboard receiver. As will be described more fully below, the integer lane count identifies the particular lane the vessel is in, and the fractional lane count describes exactly where within a given lane the vessel is located.

In both the range-range and hyperbolic navigational systems, the shipboard receiver constantly interprets the signals. As the vessel proceeds from point to point, the receiver counts the lanes and keeps track of the integer lane count. Therefore, as long as there is no interruption in the signals, the radio navigational system provides extremely accurate position information for the vessel. The integer lane count information tells the operator the lane box in which the vessel is located, and the fractional lane count information precisely defines the position of the vessel within that box.

By their nature, radio and acoustic ranging systems frequently include an ambiguity in the integer lane count. The signals of these systems repeat at short intervals of a few seconds to a few microseconds. During offshore navigation, it is not unusual for radio reception to be lost for a short period or for the signal to be shifted out of phase. For example, the reception or phase angle might be lost or shifted because of weather conditions or interference with large metal masses or skywave propagation with the radio signals. Once reception is lost, the shipboard receiver is no longer certain of the integer lane count. For example, if the signals repeat every ten microseconds, then the receiver on the vessel can determine that the lane count might be 120.37 microseconds, or 130.37 microseconds, or 140.37 microseconds, and so forth. It cannot, however, distinguish among these possibilities. This uncertainty is commonly known as "lane ambiguity." Thus, the navigational system can always determine precisely where the vessel is in a "lane," but it cannot accurately determine in which of the many possible adjacent lanes the vessel is located, if the radio or acoustic signal is ever lost.

Once "lane ambiguity" occurs through the loss of lane count, accurate navigation cannot be continued with range-range and hyperbolic navigational systems until the vessel can determine its position by some other means. Frequently the actual position of the vessel is determined by returning the vessel to shore or to a marker buoy which has been placed at a known location in the ocean. A return trip to shore requires considerable and expensive time and travel, and marker buoys are difficult and expensive to deploy, locate and retrieve. Other naviqation techniques, such as satellite and sextant naviqation systems, are qenerally not sufficiently precise to determine the specific lane in which a vessel is located.

When a vessel is being used for geophysical surveys, rig positioning, hazard surveys, hydrographic surveys, and similar applications, it is essential that the precise position of the vessel be known throughout the operations. It is further important that time and money not be lost because of a need to correct lane count error by conventional methods.

SUMMARY OF THE INVENTION

The object of the present invention is to provide a method and apparatus for determining the lane count error, if any, in a navigational system efficiently and inexpensively. Another object is to provide a method and apparatus which is compatible with conventional radio and acoustic navigational systems. A further object is to provide a method and apparatus that relies upon information supplied by a conventional navigational system, thereby decreasing the complexity and cost of the method and apparatus.

Additional objects and advantages of the invention will be set forth in part in the description which follows, and in part will be obvious from the description, or may be learned by practice of the invention. The objects and advantages may be realized and attained by means of the steps, elements and combinations particularly pointed out in the appended claims.

To achieve the objects and in accordance with the purpose of the invention, as embodied and broadly described herein, the invention includes a method for determining lane count error, if any, in a conventional navigational system which includes at least two fixed transmitting stations and a first navigational instrument on a vessel, the system giving the position of a vessel in an integer and fractional lane count format but having an inherent integer lane count ambiguity, the method comprising (1) positioning a transponder at a known depth and at a known position relative to the fixed transmitting stations; (2) positioning a second navigation instrument on the vessel, said second navigation instrument being operational with said transponder to determine the distance R between the transponder and the vessel; (3) moving the vessel from position $S_1$ to position $S_2$ and taking readings from the first and second navigational instruments to obtain data representing (a) the actual distances $R_1$ and $R_2$ between the transponder and the positions $S_1$ and $S_2$, respectively, and (b) the integer and fractional lane count readings, as given by the conventional navigational system, for the positions $S_1$ and $S_2$; (4) calculating from the integer and fractional lane count readings for positions $S_1$ and $S_2$, a vector V representing the actual distance D and direction $\phi$ the vessel has traveled from position $S_1$ to position $S_2$; (5) calculating from the known position and depth of the transponder, the known distances $R_1$ and $R_2$, and the known vector V, two mathematically possible mirror image positions of $S_1$ and $S_2$ relative to the transponder, one set of mirror image positions $S_1$ and $S_2$ representing the actual positions of the vessel and the other set of mirror image positions $S_1'$ and $S_2'$ representing a false position of the vessel; and comparing the calculated possible mirror image positional information with the information provided by one or the other of the first and second navigational instruments to determine the actual portion of the vessel, and thereby determine the lane count error in the conventional navigational system.

In one embodiment the step of comparing includes the steps of calculating from the known position of the transducer and the known relationship between the transducer and the two possible mirror image positions of $S_1$ and $S_2$, the lane and fractional lane count position of at least $S_1$ and its corresponding mirror image $S_1'$ relative to the fixed stations; and concluding that the actual position of the vessel is represented by the lane and fractional count for $S_1$ calculated in step 6 which has a fractional lane count equal to the fractional lane count of $S_1$ given by the radio navigational system in step 3. In another embodiment the step of comparing includes the step of calculating the distances between at least two calculated mirror image positions and the transponder and comparing the calculated distances with the actual distance given by the second navigational instrument for that respective position to determine which of the two possible mirror image positions is correct.

To achieve the objects and in accordance with the purpose of the invention, as embodied and broadly described herein, the apparatus of this invention also comprises an auxiliary navigation system to determine lane count error, if any, in a conventional navigational system which includes at least two fixed transmitting stations and a first navigation instrument on a vessel, the conventional navigational system giving the position of a vessel in an integer and fractional lane count format but having an inherent lane count ambiguity, the auxiliary system comprising a transponder to be positioned at a known depth and at a known position relative to the first transmitting station; a second navigational instrument positioned on the vessel for operating in conjunction with said transponder to determine the distance R between the transponder and the vessel; and a computer means interconnected with both the first navigational instrument of the conventional navigational system and the second navigational instrument, said computer means including means for storing the information provided by the first and second navigational instruments and for determining from the stored information the lane count error, if any, in the conventional navigational system.

The method and apparatus of the present invention overcomes the problems and disadvantages of the prior art by providing a simple and economic means to determine the lane count ambiguity in radio navigational systems. Although the auxiliary navigation system of this invention cannot by itself provide complete navigation information, it efficiently and economically combines with a conventional system to markedly improve that system. This characteristic of the present invention reduces its cost and complexity.

It is understood that both the foregoing general description and the following detailed description are exemplary and explanatory only and are not restrictive of the invention, as claimed.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Figure 1:
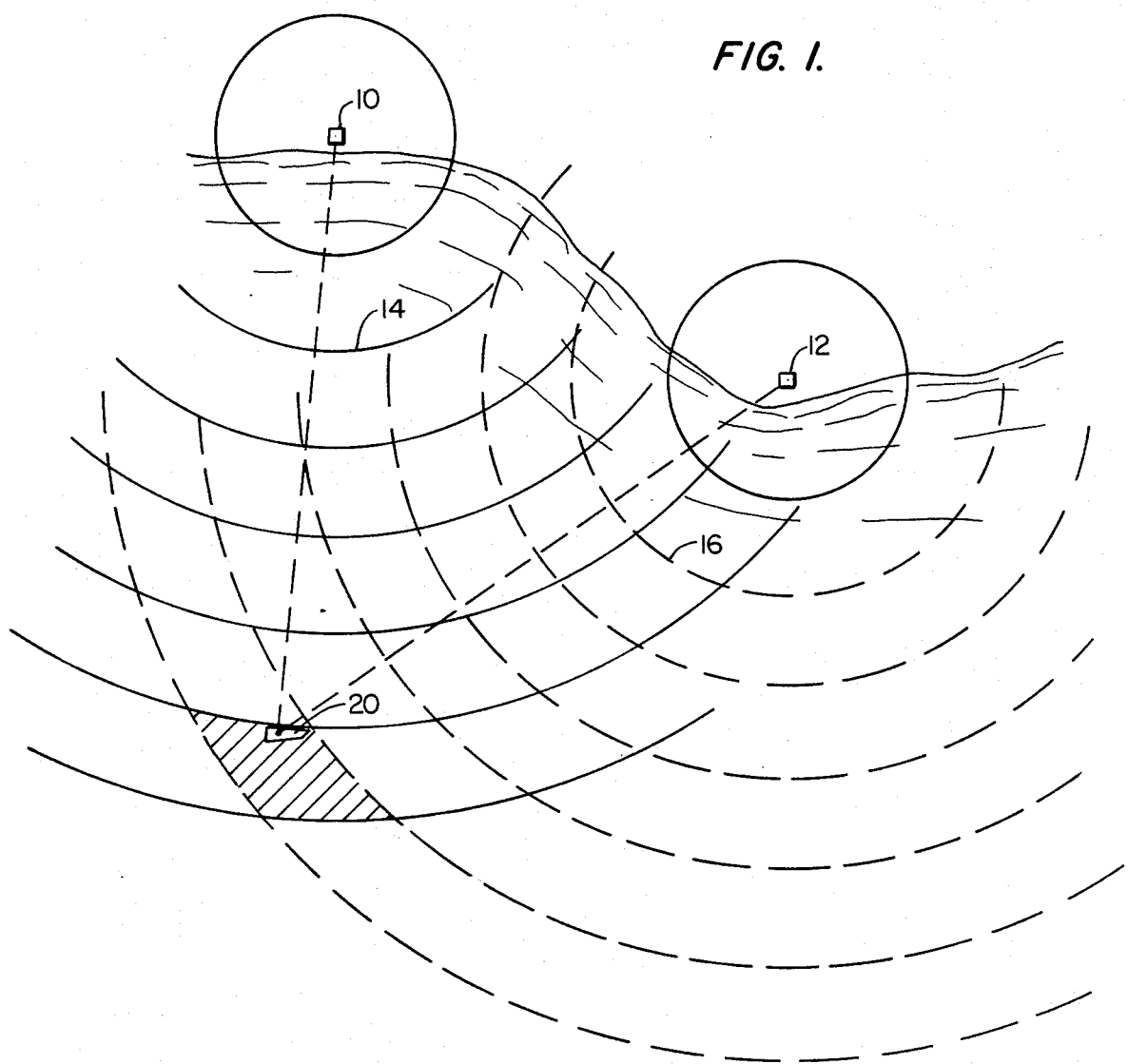
FIG. 1 is a plan view illustrating the general principles of a range-range conventional radio or acoustic navigational system.

FIG. 1 illustrates the general concept of a conventional navigational system which gives the position of vessel in an integer and fractional lane count format. Although this figure illustrates a range-range navigational system, the resultant lane grid and lane count format of a hyperbolic system are very analogous. The range-range system shown includes a first fixed transmitting station 10 and a second fixed transmitting station 12. Stations 10 and 12 emit radio or acoustic beams at a fixed frequency, creating in essence a plurality of spaced circles, designated generally as 14 and 16, which surround each station. Vessel 20 includes instrumentation which transmits and/or receives signals from the fixed stations 10 and 12 to determine the position of the vessel relative to the fixed stations. If the signals are continuously monitored, the system can precisely locate the vessel 20 within generally rectangular box 22 defined by the intersecting circles emitting from the stations 10 and 12.

While a hyperbolic navigational system operates on slightly different principles which are well-known in the art, the system ultimately provides the user with information similar to that shown in FIG. 1. That is, if the signals are continuously monitored, the user will know the precise position of vessel 20 within a particular box 22. In a hyperbolic system, however, the lanes are defined by intersecting lines of hyperbolae.

Figure 2:
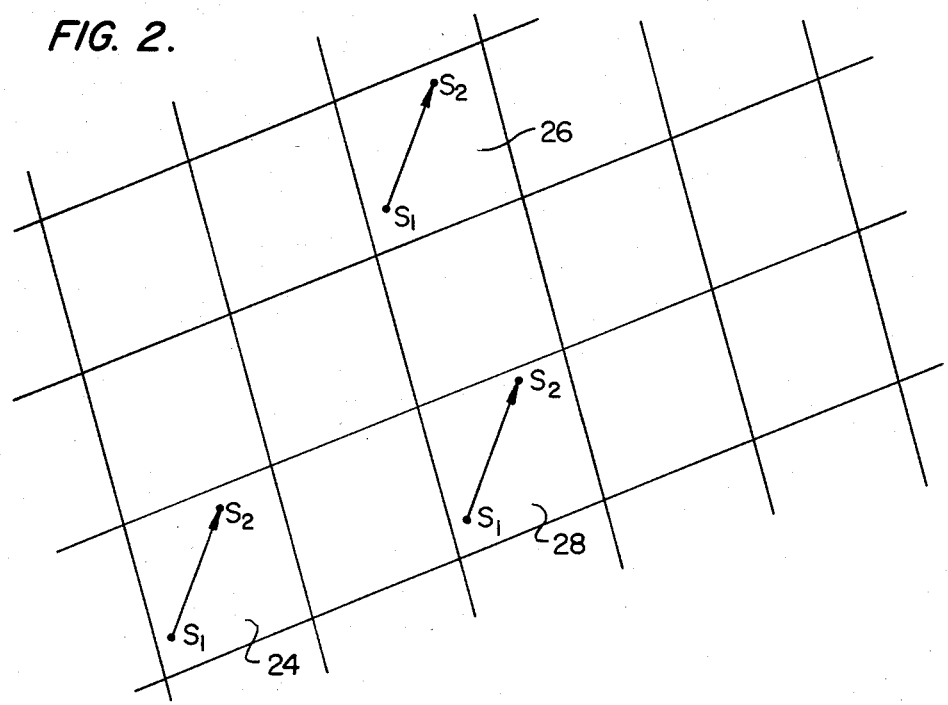
FIG. 2 is a plan view illustrating the inherent lane ambiguity in a range-range or hyperbolic navigational system.

The inherent problems associated with either a range-range or hyperbolic radio navigational systems are illustrated in FIG. 2. Both systems essentially create a plurality of intersecting lanes which define a grid system like that shown in FIG. 2. If the vessel moves from a position $S_1$ to position $S_2$, a radio navigational system can precisely locate the positions $S_1$ and $S_2$ of the vessel in a given box. However, if the signal is lost, the operator will not know in which of many possible lanes the vessel is actually located. For example, as shown in FIG. 2, a vessel might be located in the lane boxes numbered 24, 26, or 28, or any of a number of additional boxes. The object of the invention, therefore, is to determine precisely in which lane the vessel actually is.

Figure 3:
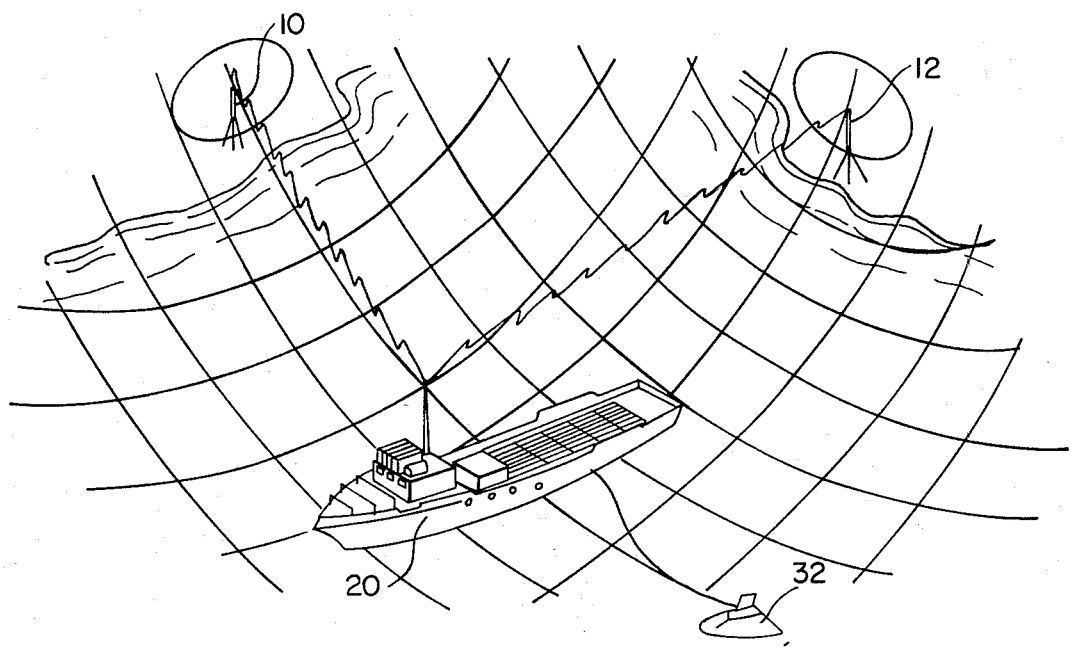
FIG. 3 is a plan view illustrating certain principles and components of the present invention in a working environment.
Figure 3:
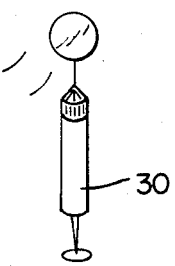

FIG. 3 shows certain elements and features of the invention in a working environment. Vessel 20 includes a receiver which transmits and/or receives signals from fixed stations 10 and 12. As previously disclosed, the system gives the position of a vessel in an integer and fractional lane count format, but has an inherent integer lane count ambiguity. To determine that lane count ambiguity, applicants position a single transponder 30 at a known position relative to the fixed transmitting stations. The system further includes a transducer 32 which is coupled to an acoustic interrogator and an acoustic receiver placed on the vessel 20. As will be described in more detail below, the acoustic system comprised of the interrogator, the receiver, the transducer 32 and the transponder 30 can be used to determine the distance between the transponder and the vessel.

Figure 4:
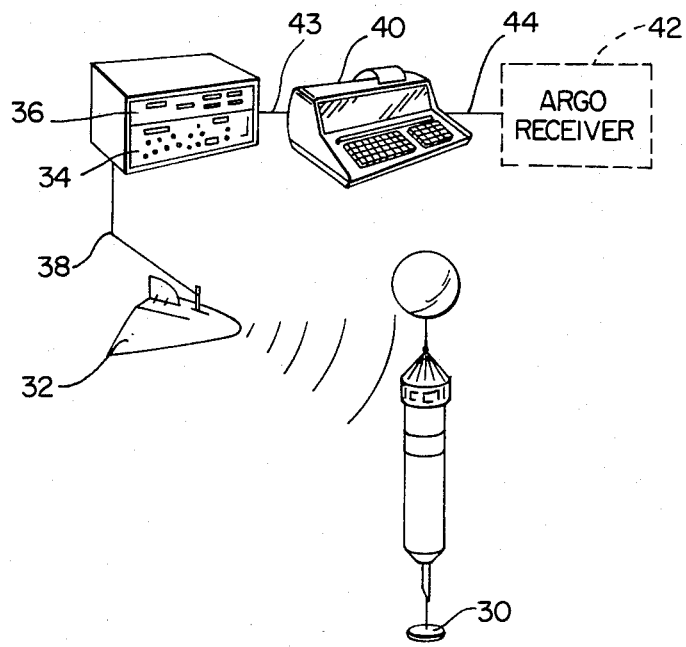
FIG. 4 is a perspective view illustrating the major components of the apparatus of the present invention.

The components of the applicants' auxiliary acoustic system, as well as the connections between that system and the conventional navigational receiver, are illustrated in FIG. 4. The acoustic system includes a transponder 30, a transducer 32, an acoustic interrogator 34, and an acoustic receiver 36. As is well known in the art, the transducer is connected with the receiver and interrogator by line 38.

The auxiliary acoustic system is used in combination with a conventional receiver 42, which can be either a transceiver for a range-range or a receiver for a hyperbolic radio or acoustic navigational system. The interrogator 34 and acoustic receiver 36 are connected with a computer 40 by a connecting line 43. The computer 40 is similarly connected with the conventional receiver 42 by a line 44. It is obvious that a wide variety of computers and interconnections can provide the necessary computer power for this system. In particular, applicants have used the Hewlett-Packard Model 85 computer and RS-232 connecting lines successfully in a working system.

As previously explained a conventional navigational system is capable of providing its user with positional information of the vessel in an integer and fractional lane count format. As is further known in the prior art, the acoustic system comprised of elements 30, 32, 38, 34 and 36 can provide the user with the range or distance between the vessel and the transponder 30. By combining the information from these two systems, applicants have invented a method and apparatus to determine the actual position of the vessel and correct any lane count error in the conventional navigational system.

Figure 5:
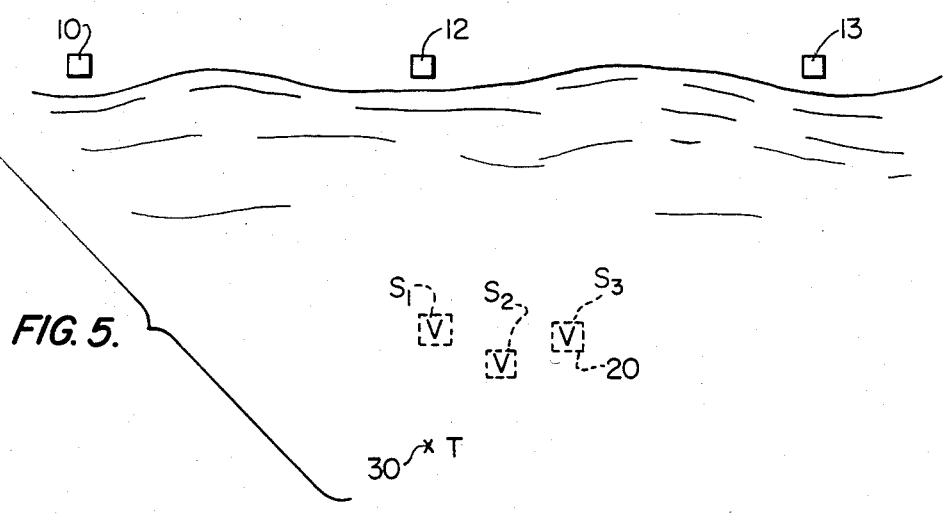
FIG. 5 is a plan view illustrating a vessel in three positions relative to three fixed shore stations and a fixed transponder.

The principles which form a basis for applicants' invention will now be described. FIG. 5 shows three positions $S_1$, $S_2$ and $S_3$ of a vessel 20 relative to fixed stations 10, 12 and 13 and a fixed transponder T. The transponder T is fixed in position, for example to the bottom of the sea, and its precise location is determined by the conventional navigational system or some other known system. Preferably, the vessel would take several readings on both the conventional and acoustic systems to mathematically determine the precise location and depth of the transponder T. As an alternative, these systems could be used to mathematically determine the precise location and depth of a fixed element T, such as a tower or other large body, which could serve as a known target of the acoustic system. The ship can then proceed with its ocean operations using radio navigation. However, when a lane uncertainty occurs, the ship can merely return to the vicinity of the previously deployed transponder or fixed element T and determine whether any lane ambiguity error exists in the conventional system.

If the conventional system loses or might have lost lane count, the vessel is returned to the general vicinity of the transponder T. At a point $S_1$, an operator simultaneously measures from the conventional navigational system the lane readings for position $S_1$ and from the acoustic system the actual distance $R_1$ between the position $S_1$ and the transponder T. The vessel then proceeds to position $S_2$ where readings from the radio navigational system and the acoustic system are again taken. In some circumstances, as explained below, the vessel may have to change course and proceed to position $S_3$ where additional readings are taken. The positions $S_1$, $S_2$ and $S_3$ of the vessel, as well as the position of the transponder T, are shown in FIGS. 5-7.

The principle of the invention is based on the fact that conventional navigational systems with lane ambiguity still provide information concerning changes in vessel position. That is, if the vessel moves from point $S_1$ to point $S_2$, then the vector displacement from $S_1$ to $S_2$ will be correctly known, even if the absolute positions of $S_1$ and $S_2$ are in error because of lane ambiguity problems. Similarly, the vector displacement from points $S_2$ to $S_3$ will be known.

In one embodiment of the invention, the lane count error can be determined from only the information taken at points $S_1$ and $S_2$. That embodiment, therefore will be described first.

Figure 6:
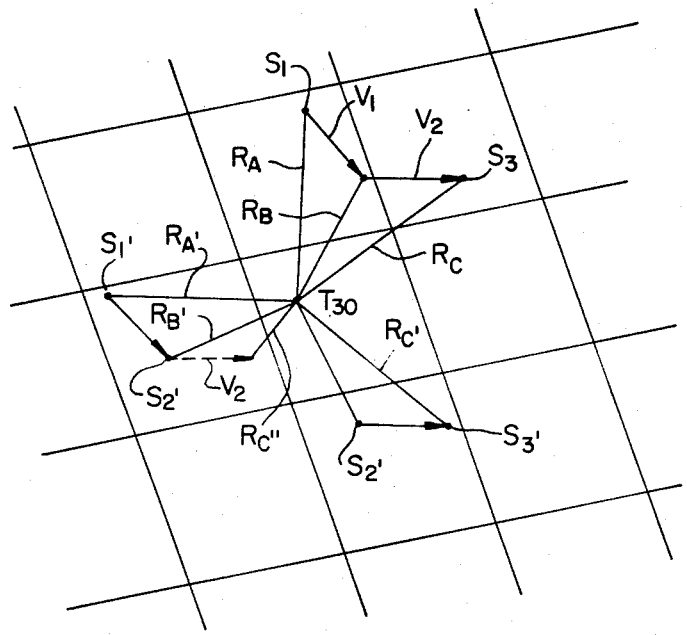
FIG. 6 is a plan view illustrating how the three positions of the vessel shown in FIG. 5 would appear on a lane grid system, and further illustrating possible mirror images of those positions on the grid system.
Figure 7:
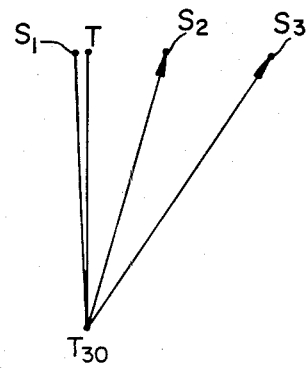
FIG. 7 is a side view of FIG. 6 showing the relationship of the position of the transponder and the three positions of the vessel illustrated in FIGS. 5 and 6.

Referring to FIG. 6, if point $S_1$ is placed into an arbitrary rectangular coordinate system, point $S_1$ would have the value $XS_1$ and $YS_1$. Similarly, the value of $S_2$ could be placed in similar coordinate form so that its value would be $XS_2$ and $YS_2$. Even if the points $XS_1$, $YS_1$ and $XS_2$, $YS_2$ are in error, the vector $XS_2-XS_1$, $YS_2-YS_1$ from points $S_1$ to $S_2$ will be approximately correct. This vector has a length (D) of $((XS_1-XS_2)^2+(YS_1-YS_2)^2)^{\frac{1}{2}}$ and an absolute orientation $\phi=tan^{-1}((YS_2-YS_1)/(XS_2-XS_1))$.

As shown in FIG. 6, the vector $V_1$ is one side of a horizontal triangle connecting points $S_1$, $S_2$ and T (the surface point of the transponder). Referring to FIGS. 6 and 7, the other sides are of a length $R_A=(R_1^2-Z^2)^{\frac{1}{2}}$ and $R_B=(R_2^2-Z^2)^{\frac{1}{2}}$, respectively, where Z is the depth of the transponder T.

Since all three sides and the orientation of one side of the triangle $S_1$, $S_2$, T are known, the location of the triangle can be determined within a mirror image ambiguity, identified by $S_1'$, $S_2'$ and T, as shown in FIG. 6. With this information, alone, however, it is not mathematically possible to determine whether points $S_1$ and $S_2$, or the points $S_1'$ and $S_2'$ are the actual locations of the vessel.

Under applicants' invention, the exact location of transducer T is determined before lane count ambiguity occurs. Thus the position of the transducer T is known with respect to the fixed stations. Therefore, after the relationships between the transducer and the two possible mirror image positions of $S_1$ and $S_2$ are determined as described above, the positions of the points $S_1$, $S_2$, $S_1'$ and $S_2'$ with respect to the fixed stations can be geometrically determined. Through relatively simple calculation, these determined positions can be then placed into lane and fractional lane count format. Once positions $S_1$, $S_2$, $S_1'$ and $S_2'$ are placed in a lane count and fractional lane count format, the calculated fractional lane count format for these positions can be compared with the actual fractional lane count of points $S_1$ and $S_2$, as given by the conventional radio or acoustic navigational system. If the fractional count is equivalent to one pair of $S_1$ and $S_2$, but not the remaining pair $S_1'$ and $S_2'$, the operator will then know that the values of $S_1$ and $S_2$ calculated from the combined radio and acoustic data are correct, and that the mirror image points $S_1'$ and $S_2'$ are in error. The lane count of calculated $S_1$ and $S_2$ can then be compared with the lane count information provided by the conventional system only. The difference in integer values of the lane count would represent the error, and that error, if any, can be corrected by resetting the lane count for the radio navigational system.

Thus, in one embodiment of the invention, applicants' method for determining lane error in a conventional navigational system includes the step of positioning a transponder at a known depth and at a known position relative to the fixed transmitting station. The position and depth of the transponder can be determined by taking several readings from both the radio and acoustic systems and applying well-known survey techniques to precisely determine both the depth and position of the transponder. If it subsequently appears that lane count may have been lost, the vessel should return to the vicinity of the transponder. The operator should then move the vessel from a position $S_1$ to a position $S_2$ and take readings from both the conventional and auxiliary acoustic navigational instruments to obtain data representing (a) the actual distances $R_1$ and $R_2$ between the transponder and the positions $S_1$ and $S_2$, respectively, and (b) the integer and fractional lane count readings, as given by the conventional navigational system, for the positions $S_1$ and $S_2$. The next step is calculating from the integer and fractional lane count readings for positions $S_1$ and $S_2$, a vector $V_1$ representing the actual distance D and direction $\phi$ the vessel has traveled from position $S_1$ to position $S_2$. Because the position and depth of the transponder, the distances $R_1$ and $R_2$, and the vector $V_1$ are known, it is then mathematically possible to determine two possible mirror image positions of $S_1$ and $S_2$ relative to the transponder, one set of mirror image positions $S_1$ and $S_2$ representing the actual positions of the vessel and the other set of mirror image positions $S_1'$ and $S_2'$ representing false positions of the vessel. Next, because the position of the transponder relative to the fixed stations and the relationships between the transponder and the two possible mirror image positions of $S_1$ and $S_2$ are known, the lane and fractional lane count positions of $S_1$, $S_2$, $S_1'$, and $S_2'$ relative to the fixed stations can be determined. Finally by comparing the calculated fractional lane counts of $S_1$, $S_2$, $S_1'$ and $S_2'$ with the fractional lane count given by the conventional system, the operator can usually determine the correct value of S1 and S2, since the calculated fractional value and the value given by the radio would be equal.

The determined actual position of points $S_1$ and $S_2$ can be placed into integer and fractional lane count format and compared with the values given by the radio system. The difference between the reading of the conventional system and the determined actual position of $S_1$ will provide the user with the integer difference representing the lane count error. The conventional system can then be corrected and additional readings can be taken from the conventional navigational system. Of course, the acoustic system can be used periodically to double check the validity of the conventional navigational readings. It is also clear that the method can be performed several times when the ship is in the same general vicinity in order to double check the corrected readings through an iterative procedure.

Although in the preferred embodiment of the invention, the calculations as set forth above and below are performed by a computer, it is clear that the computer is not necessary for the performance of the above method.

Under certain circumstances, the first embodiment described above will not provide the user with an absolute determination of the lane count error. For example, it is possible that the calculated values for $S_1$ and $S_1'$ as well as the calculated values of $S_2$ and $S_2'$ will have the same or a closely similar fractional lane count values. Under that circumstance, additional steps are required to determine the lane ambiguity. One solution would be to change course and take additional readings and then follow the same process until the calculated values for $S_1$ and $S_1'$ and $S_2$ and $S_2'$ do not have the same or closely similar fractional lane counts. In addition, applicants have discovered a second embodiment of the invention which solves this problem and is described below.

The second embodiment includes the step of changing the course of the vessel and moving the vessel along the changed course from position $S_2$ to position $S_3$. As shown in FIG. 6, under those circumstances the possible solutions for the known values of $V_1$, $V_2$, $R_1$, $R_2$, and $R_3$ are the actual triangles T, $S_1$, $S_2$ and T, $S_2$, $S_3$ and the mirror image triangles T, $S_1'$, $S_2'$ and T, $S_2'$, $S_3'$. The relationships of those points and the mathematics required to determine their relative positions are the same as previously explained.

The vector $V_2$ can be determined, as previously described. As shown in FIGS. 6 and 7, when vector $V_2$ is added to the actual position $S_2$, the distance $R_C$ will be equal to the actual distance given by the acoustic system. On the other hand, the vector $V_2$ when added to point $S_2'$ will provide a calculated value $R_C''$ which is not equal to the actual value $R_C$. Therefore, by calculating the potential values $R_3$ and $R_3''$ from the calculated values of $R_C$ and $R_C''$ and the known value of Z and by then comparing those values of $R_3$ and $R_3''$ with the actual value of $R_3$ given by the acoustic system, the user can determine that positions $S_1$, $S_2$ and $S_3$ are correct.

In view of the above geometric relationships the second embodiment of applicants' invention includes the steps of moving the vessel from position $S_1$ to position $S_2$ and then changing the course of the vessel and moving the vessel along the changed course from position $S_2$ to position $S_3$. Readings are taken from the first and second navigational instruments at points $S_1$, $S_2$ and $S_3$ to obtain data representing (a) the actual distances $R_1$, $R_2$ and $R_3$ between the transponder and the positions $S_1$, $S_2$ and $S_3$, respectively, and (b) the integer and fraction lane count readings, as given by the radio navigational system, for the positions $S_1$, $S_2$ and $S_3$. Next, vectors $V_1$ and $V_2$ and the possible mirror image positions of $S_1$, $S_2$, and $S_3$ are calculated, one mirror image position $S_1$, $S_2$ and $S_3$ representing the actual positions of the vessel and the other mirror image position $S_1'$, $S_2'$ and $S_3'$ representing false positions of the vessel. Because the position and depth of the transponder, the distances $R_1$ and $R_3$, and the vector $V_2$ are known, two mathematically possible values for the distances between the transducer and the positions $S_3$ and $S_3'$ can be calculated. One calculated value $R_3$ will represent the actual distance between $S_3$ and the transponder, and the other calculated value $R_3'$ will represent a false distance between $S_3'$ and the transponder. The actual position $S_3$ will have a calculated value $R_3$ which is equal to the actual value of $R_3$ given by the acoustic system. It therefore will be known that calculated points $S_1$, $S_2$ and $S_3$ represent the actual positions of the vessel. It is then possible to calculate from the known position of the transducer and the known relationship between the transponder and the positions $S_1$, $S_2$ and $S_3$, the lane and fractional lane count position of at least one of positions $S_1$, $S_2$ and $S_3$. This correct lane count information can be compared with the information given by the conventional system, and the count on the conventional system can then be corrected.

It should be obvious that the above two described methods are illustrative of the invention, but not restrictive of the possibilities. For example, the step of comparing fractional lane counts described in the first embodiment could be used as an alternate step in the second embodiment. That is, if the fractional counts of calculated $S_1$ and $S_2$ are equal or roughly equal to those of calculated $S_1'$ and $S_2'$, it is highly unlikely that the values of calculated $S_3$ and $S_3'$ will be equal. If they are not, the fractional lane counts of $S_3$ and $S_3'$ can be compared with the fractional lane count of $S_3$ given by the radio system. It would not then be necessary to calculate and compare values of $R_3$ and $R_3''$. In addition, a system could use both of the above described methods and compare the results as a double check. Finally, it is apparent that several readings using one or both of the above methods can be taken so that the process can be checked through an iteration procedure.

It is further apparent that elements other than those illustrated in the drawings and described in the specification can be used to perform applicants' invention. A wide variety of acoustic and radio systems could be used to determine the distance the vessel is from a given point T. For example, point T could be a transponder or a fixed element capable of receiving and echoing acoustic or radio signals. Any other system which can provide the user with reliable information concerning the distance between the vessel and a given point is within the scope of the invention.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed:

1. A method for determining lane count error, if any, in a conventional navigational system which includes at least two fixed transmitting stations and a first navigation instrument on a vessel and which gives the position of a vessel in an integer and fractional lane count format but has an inherent integer lane count ambiguity, the method comprising:
    (1) surveying an element to determine its known depth and position relative to the fixed transmitting stations;
    (2) positioning a second navigation instrument on the vessel, said second navigation instrument being capable of determining the distance R between the surveyed element and the vessel;
    (3) moving the vessel from a position $S_1$ to a position $S_2$ and taking readings from the first and second navigational instruments to obtain data representing at least (a) the actual distances $R_1$ and $R_2$ between the surveyed element and the positions $S_1$ and $S_2$, respectively, and (b) the integer and fractional lane count readings, as given by the conventional navigational system, for the positions $S_1$ and $S_2$;
    (4) calculating from the known position and depth of the element, the known distances R1 and R2, and the known integer and fractional lane count readings, the mathematically possible mirror image positions of at least $S_1$ and $S_2$ relative to the element, one set of mirror image positions $S_1$ and $S_2$ representing the actual position of the vessel and the other set of mirror image positions $S_1'$ and $S_2'$ representing false positions of the vessel; and
    (5) comparing the calculated possible mirror image positional information with the information provided by one or the other of the first and second navigational instruments to determine the actual position of the vessel, and thereby determine the lane count error in the conventional navigational system.

2. The method of claim 1 wherein the step of comparing the calculated possible mirror image positional information includes the step of comparing the calculated fractional lane count of at least two calculated mirror image positions with the actual reading of the fractional lane count given by the first navigational instrument for that respective position to determine which of the two possible mirror image positions is correct.

3. The method of claim 1 wherein the step of comparing the calculated possible mirror image positional information includes the step of calculating the distances between at least two calculated mirror image positions and the surveyed element and comparing the calculated distances with the actual distance given by the second navigational instrument for that respective position to determine which of the two possible mirror image positions is correct.

4. A method for determining lane count error, if any, in a conventional navigational system which includes at least two fixed transmitting stations and a first navigation instrument on a vessel and which gives the position of a vessel in an integer and fractional lane count format but has an inherent integer lane count ambiguity, the method comprising:
    (1) positioning a transponder at a known depth and at a known position relative to the fixed transmitting stations;
    (2) positioning a second navigation instrument on the vessel, said second navigation instrument being operational with said transponder to determine the distance R between the transponder and the vessel;

(3) moving the vessel from position $S_1$ to position $S_2$ and taking readings from the first and second navigational instruments to obtain data representing (a) the actual distances $R_1$ and $R_2$ between the transponder and the positions $S_1$ and $S_2$, respectively, and (b) the integer and fractional lane count readings, as given by the conventional navigational system, for the positions $S_1$, and $S_2$;

(4) calculating from the integer and fractional lane count readings for positions $S_1$ and $S_2$ a vector $V$ representing the actual distance $D$ and direction $\phi$ the vessel has traveled from position $S_1$ to position $S_2$;

(5) calculating from the known position and depth of the transponder, the known distances $R_1$ and $R_2$ and the known vector $V$, two mathematically possible mirror image positions of $S_1$ and $S_2$ relative to the transponder, one set of mirror image positions $S_1$ and $S_2$ representing the actual position of the vessel and the other set of mirror image positions $S_1'$ and $S_2'$ representing a false position of the vessel;

(6) calculating from the known position of the transponder and the known relationship between the transponder and the two possible mirror image positions of $S_1$ and $S_2$, the lane and fractional lane count position of at least $S_1$ and its corresponding mirror image $S_1'$ relative to the fixed stations; and (7) comparing the calculated fractional lane count of the possible mirror image positions of $S_1$ and $S_1'$ calculated in step 6 with the fractional lane count of $S_1$ given by the conventional navigational system in step 3 and concluding that the actual position of the vessel is represented by the lane and fractional count for $S_1$ calculated in step 6 which has a fractional lane count equal to the actual fractional lane count of $S_1$ given by the conventional navigational system in step 3.

5. A method for determining lane count error, if any, in a conventional navigational system which includes at least two fixed transmitting stations and a first navigation instrument on a vessel and which gives the position of a vessel in an integer and fractional lane count format but has an inherent integer lane count ambiguity, the method comprising:

(1) positioning a transponder at a known depth and at a known position relative to the fixed transmitting stations;

(2) positioning a second navigational instrument on the vessel, said second navigational instrument being operational with said transponder to determine the distance $R$ between the transponder and the vessel;

(3) moving the vessel from position $S_1$ to position $S_2$ and then changing the course of the vessel and moving the vessel along the changed course from position $S_2$ to position $S_3$;

(4) taking readings from the first and second navigational instruments at points $S_1$ and $S_2$ to obtain data representing (a) the actual distances $R_1$, $R_2$ and $R_3$ between the transponder and the positions $S_1$, $S_2$ and $S_3$, respectively, and (b) the integer and fraction lane count readings, as given by the conventional navigational system, for the positions $S_1$, $S_2$ and $S_3$;

(5) calculating from the integer and fractional lane count readings for positions $S_1$ and $S_2$ a vector $V_1$ representing the actual distance $D_1$ and the direction $\phi_1$ the vessel has traveled from $S_1$ to $S_2$;

(6) calculating from the integer and fractional lane count readings from positions $S_2$ and $S_3$ a vector $V_2$ representing the actual distance $D_2$ and direction $\phi_2$ the vessel has traveled from $S_2$ to $S_3$;

(7) calculating from the known position and depth of the transponder, the known distances $R_1$, $R_2$ and $R_3$, and the known vectors $V_1$ and $V_2$, two sets of mathematically possible mirror image positions of $S_1$, $S_2$, and $S_3$ relative to the transponder, one set of mirror image positions $S_1$, $S_2$ and $S_3$ representing the actual position of the vessel and the other set of mirror image positions $S_1'$, $S_2'$ and $S_3'$ representing false positions of the vessel;

(8) calculating from the known position and depth of the transponder, the known distances $R_1$ and $R_2$ and the known vectors $V_1$ and $V_2$, two mathematically possible values for the distance between positions $S_3$ and $S_3'$ and the transducer, one calculated value $R_3$ representing the actual distance between $S_3$ and the transponder and the other calculated value $R_3'$ representing a false distance between $S_3'$ and the transponder; and (9) comparing the calculated possible values of $R_3$ and $R_3'$ calculated in step 8 with the distance $R_3$ given by the second navigational instrument in step 4 and concluding that the actual position of the vessel is the position $S_3$ which has the calculated value $R_3$ calculated in step 8 which is equal to the actual value of $R_3$ determined in step 4.

6. The method of claim 5 further comprising the step of calculating from the known position of the transponder and the known relationship between the transponder and the positions $S_1$, $S_2$ and $S_3$, the lane and fractional lane count position of at least one of positions $S_1$, $S_2$ and $S_3$.

7. An auxiliary navigation system to determine lane count error, if any, in a conventional navigational system which includes at least two fixed transmitting stations and a first navigation instrument on a vessel, the conventional navigational system giving the position of a vessel in an integer and fractional lane count format but having an inherent lane count ambiguity, the auxiliary system comprising:

a transponder positioned at a known depth and at a known position relative to the fixed transmitting stations;

a second navigational instrument positioned on the vessel for operating in conjunction with said transponder to determine the distance $R$ between the transponder and the vessel; and computer means interconnected with both the first navigational instrument of the radio navigational system and the second navigational instrument, said computer means including means for storing the information provided by the first and second navigational instruments, calculating possible mirror image positions of the vessel, and comparing the possible mirror image positional information with the information provided by one or the other of the first and second navigational instruments to determine the actual positions of the vessel, and thereby determine the lane count error in the conventional navigational system.

* * * * *